United States Patent [19]
Jayakumar et al.

[11] Patent Number: 5,481,725
[45] Date of Patent: Jan. 2, 1996

[54] METHOD FOR PROVIDING PROGRAMMABLE INTERRUPTS FOR EMBEDDED HARDWARE USED WITH PROGRAMMABLE INTERRUPT CONTROLLERS

[75] Inventors: Muthurajan Jayakumar, Folson, Calif.; Ronald Mosgrove; Hugh Bynum, both of Portland, Oreg.

[73] Assignee: Intel Corporation, Santa Clara, Calif.

[21] Appl. No.: 102,138

[22] Filed: Aug. 3, 1993

[51] Int. Cl.$^6$ ............................................. G06F 13/26
[52] U.S. Cl. ................................... 395/725; 395/325
[58] Field of Search ............................ 395/725; 397/725, 397/395, 275

[56] References Cited

U.S. PATENT DOCUMENTS

| | | | |
|---|---|---|---|
| 4,788,639 | 11/1988 | Tamara | 395/725 |
| 5,083,261 | 1/1992 | Wilkie | 395/725 |
| 5,101,497 | 3/1992 | Culley et al. | 395/725 |
| 5,125,093 | 6/1992 | McFarland | 395/725 |
| 5,261,107 | 11/1993 | Klim et al. | 395/725 |
| 5,283,904 | 2/1994 | Carson et al. | 395/725 |
| 5,325,536 | 6/1994 | Charg et al. | 395/725 |
| 5,410,710 | 4/1995 | Saravgdhar et al. | 395/725 |

*Primary Examiner*—Jack B. Harvey
*Assistant Examiner*—David A. Wiley
*Attorney, Agent, or Firm*—Blakely, Sokoloff, Taylor & Zafman

[57] ABSTRACT

A process for generating an interrupt of programmable priority for a piece of embedded hardware associated with a first interrupt controller providing interrupts for a processor having a priority which is not programmable in a computer system including a second interrupt controller providing interrupts for the processor having a priority which is programmable. The process for causing the interrupts furnished by the first controller for the embedded hardware device to have programmable priority including the steps of generating a general interrupt at the output of the first interrupt controller in response to a signal to the first processor from the associated embedded hardware device, transferring the general interrupt to the second interrupt controller, responding to the general interrupt by signaling the associated processor that a general interrupt has been received by the second interrupt controller from the first interrupt controller, determining from the first interrupt controller the particular embedded hardware device which caused the generation of the general interrupt, and selecting an interrupt handler routine from memory for the particular embedded hardware device to provide an interrupt vector for the particular embedded hardware device to the second interrupt controller.

25 Claims, 4 Drawing Sheets

METHOD FOR PROVIDING PROGRAMMABLE INTERRUPTS FOR EMBEDDED HARDWARE USED WITH PROGRAMMABLE INTERRUPT CONTROLLERS

BACKGROUND OF THE INVENTION

1. Field of the Invention

This invention relates to computer systems and, more particularly, to methods and apparatus for providing advanced programmable interrupt control circuitry for use with Intel microprocessors having associated embedded hardware.

2. History of the Prior Art

Historically, computers utilizing microprocessors manufactured by Intel Corporation of Santa Clara, Calif., such as the 8088, 8086, 80186, 80286, i386™, and i486™ (herein referred to as Intel processors) have included an Intel 8259 programmable interrupt controller (PIC) or an interrupt controller patterned thereon. This interrupt controller provides interrupt signals to an associated processor for various hardware devices associated with the processor. The priority level of an interrupt provided by these controllers is fixed for each hardware device and depends on the input pin position on the PIC where the particular hardware device from which the interrupt signal emanates is connected. That is, an interrupt from the keyboard is always transferred to the processor by the interrupt controller at a certain priority level while an interrupt from another hardware device is transferred to the processor by the controller at another priority level. These priority levels are hardwired and remain constant throughout the operation of the device. In systems using multiple processors, such an interrupt controller is capable of furnishing interrupts to only a single one of the processors. Consequently, it has been necessary to provide software solutions to control the inter-relation of interrupts in systems using many processors.

With more advanced computer systems running advanced operating systems, it is desirable to be able to change the priority level at which interrupt signals from a particular hardware component are handled as the circumstances of operation change. That is, a particular interrupt may be very important in certain instances and less important in other circumstances. Therefore, it is desirable that the priority levels of particular hardware be programmable.

Moreover, the operation of a computer system depends on the correct interrelation between the operation of the hardware and the software. Consequently, interrupt priority levels associated with the software processes and interrupts from hardware devices should be coordinated and made programmable so that the use of interrupts may depend on the circumstances of the computer system operation. More advanced operating systems provide for this coordination of hardware and task interrupt priority levels. In addition, it is desirable that all of the interrupts in a system utilizing multiple processors be coordinated so that a processor may provide interrupts to other processors to effect the best use of software it is running and so that a processor which is the least utilized may handle an interrupt for another processor without the need to accomplish this by the use of software control.

Recently, a new interrupt controller has been designed which is capable of accomplishing these desirable features, among others. Intel Corporation markets this interrupt controller as the 82489DX Advanced Programmable Interrupt Controller (APIC). This controller provides multiprocessor interrupt management which includes programmable interrupts for both tasks and devices. This controller also has facilities for transferring interrupts between processors and to the least used one of a plurality of processors used in a multiprocessor system. Such a controller is described in detail in a publication entitled 82489*DX Advanced Programmable Interrupt Controller*, published by Intel Corporation of Santa Clara, Calif.

However, the great majority of existing Intel processors utilize 8259 type PIC interrupt controllers. The system software is written to utilize these PIC interrupt controllers. A large number of application programs which are used extensively are run on these operating systems that do not utilize the newer Intel APIC controller. Instead these processors and systems provide interrupts based on the presence of the older PIC controller. In order to utilize existing Intel processors in advanced computer systems which include the newer APIC interrupt controllers to obtain the advantages these newer interrupt controllers offer, it has been necessary to devise circuitry which incorporates both controllers and to modify the system software to run with this hybrid system of interrupt controllers. In this hybrid interrupt controller system, the system basic input/output start up (BIOS) routines programs the APIC controller upon initialization of the circuitry; and the hybrid system software handles the PIC controller during operation so that the two controllers may operate together.

The simplest arrangement for combining the controllers connects the hardware devices which utilize the PIC controller to fixed pins of that controller and provides the output of the PIC controller as one of the input pins of the new APIC controller. Since the hardware interrupts provided by the PIC controller will vary from lowest to highest priority, it is necessary that the APIC controller receiving an interrupt for these devices to treat that interrupt as always of the highest priority. The ultimate effect of this arrangement is always to give the hardwired device interrupts connected to the PIC controller the highest priority and to make them non-programmable with respect to new interrupts and to various software process interrupts. This has the effect of slowing the operation of controlling interrupts to that at which the older interrupt controller works and obviates most of the advantages obtained by including the new controller.

Another arrangement for the two controllers connects the hardware devices which utilize the PIC controller to fixed pins of that controller but also provides these inputs to the APIC controller. This allows the hardware interrupts which are routed around the PIC controller to be individually programmable by the new APIC controller. However, if any hardware devices are embedded in the same circuitry (in the same chipset) as the controller and do not allow touting the interrupts around the controller, these interrupts must still be provided to the APIC controller as the output of the PIC controller on one of the input pins to the APIC controller. Since the particular interrupt is unknown to the APIC controller and because the interrupts provided by the PIC controller will vary from lowest to highest priority, it is necessary that the APIC controller receiving such an interrupt also treat that interrupt as always of the highest priority. The ultimate effect of this arrangement is always to give the hardwired device interrupts connected to the PIC controller the highest priority and to make them non-programmable with respect to new interrupts and to various software process interrupts. As with the other arrangement, this has the effect of slowing the operation of controlling interrupts to the speed at which the older interrupt controller works and obviates most of the advantages obtained by including the new controller.

SUMMARY OF THE INVENTION

It is, therefore, an object of the present invention to provide circuitry and a method by which the operations of computer systems utilizing hybrid interrupt controller arrangements may be accelerated.

It is another, more specific, object of the present invention to provide an arrangement by which the priority level of interrupts provided to older interrupt controllers may be made programmable and may be transferred to other processors.

These and other objects of the present invention are realized in a process for generating an interrupt of programmable priority for a piece of embedded hardware associated with a first interrupt controller providing interrupts for a processor having a priority which is not programmable. This is accomplished in a computer system including a second interrupt controller providing interrupts for the processor having a priority which is programmable through the use of attributes of the second interrupt controller. The process for causing the interrupts furnished by the first controller for the embedded hardware device to have programmable priority includes the steps of generating a general interrupt at the output of the first interrupt controller in response to a signal from the associated embedded hardware device, transferring the general interrupt to an input terminal of the second interrupt controller, responding to the general interrupt by signaling the associated processor that a general interrupt has been received by the second interrupt controller from the first interrupt controller, determining from the first interrupt controller the particular embedded hardware device which caused the generation of the general interrupt, selecting an interrupt handler routine from memory for the particular embedded hardware device, running the handler routine to transfer an interrupt vector for the particular embedded hardware device to the second interrupt controller, and responding to the interrupt vector transferred to the second interrupt controller.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method for operating a computer in processing electrical or other (e.g. mechanical, chemical) physical signals to generate other desired physical signals.

DETAILED DESCRIPTION OF THE INVENTION

Figure 1:
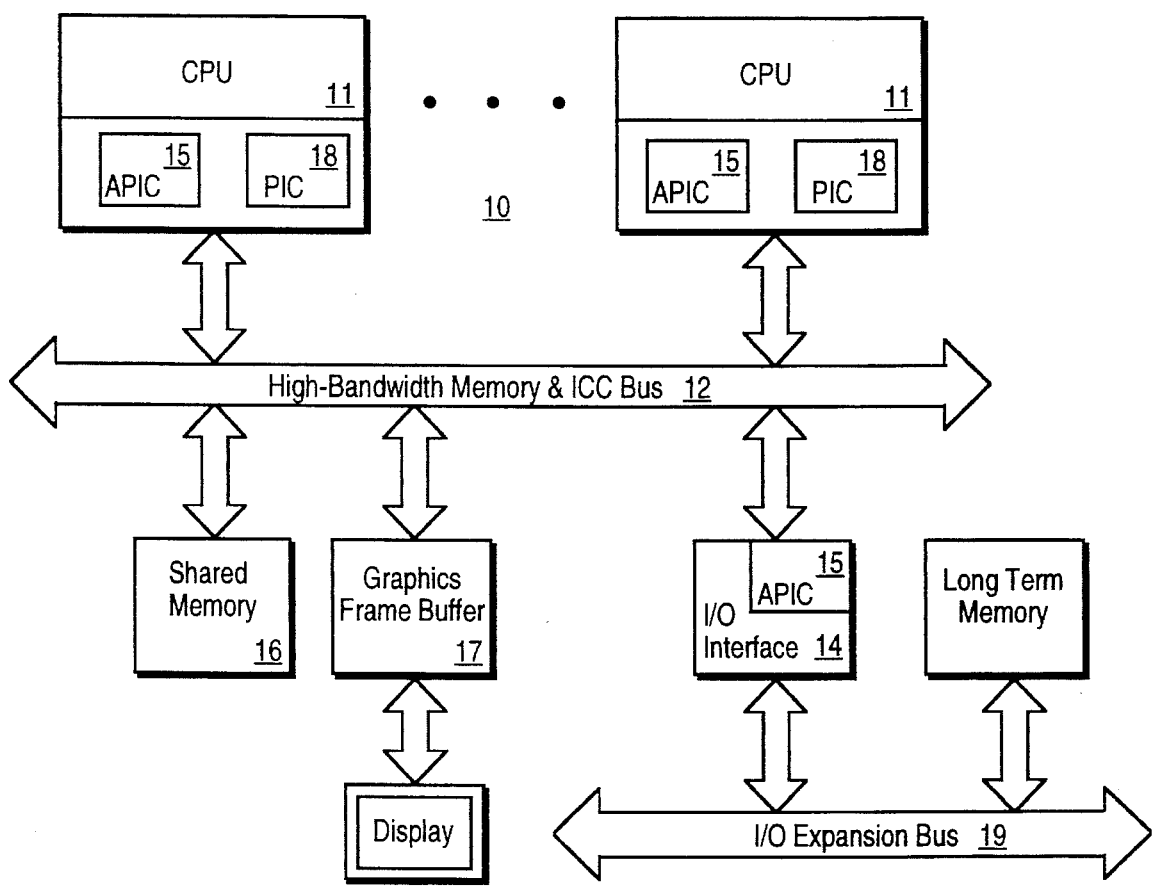
FIG. 1 is a block diagram illustrating a computer system including the present invention.

Referring now to FIG. 1, there is illustrated a computer system 10. The system 10 illustrated is a multiprocessor system which includes a plurality of central processing units 11 each arranged in a symmetric architecture in which all processors are identical and each processor can communicate with every other processor. In this architecture, each processor 11 is joined to a high-bandwidth memory and interrupt controller communication (ICC) bus 12. In the arrangement illustrated, each processor 11 has associated with it an advanced programmable interrupt controller (APIC) 15 which may be an Intel 82489DX controller and a programmable interrupt controller (PIC) 18 which may be an Intel 8259A or similar interrupt controller. As will be explained, these controllers are arranged to control interrupts directed to and between the various processors 11 in accordance with the present invention. The bus 12 is adapted to carry information to various components of the system 10. Joined to the bus 12 is main memory 16 which is typically constructed of dynamic random access memory arranged in a manner well known to those skilled in the prior art to store information during a period in which power is provided to the system 10. Main memory 16 is in the illustrated architecture shared by the various processors 11. Also joined to the bus 12 are various system components such as a graphics frame buffer 17 and an input/output interface unit 14. As is well known to those skilled in the art, the graphics frame buffer 17 may be connected to provide output to an output display device such as a monitor on which the output of the computer system 10 may be displayed. As is shown in the figure, the input/output interface unit 14 is joined to the bus 12 in a unit including an advanced programmable interrupt controller 15 utilized to assist in controlling access to the bus 12 for components on an I/O expansion bus 19. The input/output interface unit 14 is joined to the bus 12 and to input/output expansion bus 19 to which may be connected various peripheral devices such as long term memory. The arrangement and operation of such a multiprocessor computer system is well known to those skilled in the art and is described in extensive detail in a publication entitled *An APIC-Based Symmetric Multiprocessor System Design,* Version 1, Intel Corporation, 1993.

As has been explained above, it has been found possible to utilize existing microprocessors in advanced computer systems which include the newer APIC interrupt controllers to obtain the advantages those controllers offer. In order to do so, it has been necessary to devise circuitry which includes both APIC and PIC controllers and to modify the system software to run with this hybrid system of controllers. In such a system, the system basic input/output start up (BIOS) routines program the APIC upon initialization of the circuitry; and the hybrid system software controls the PIC during system operation so that the two controllers may operate together.

Figure 2:
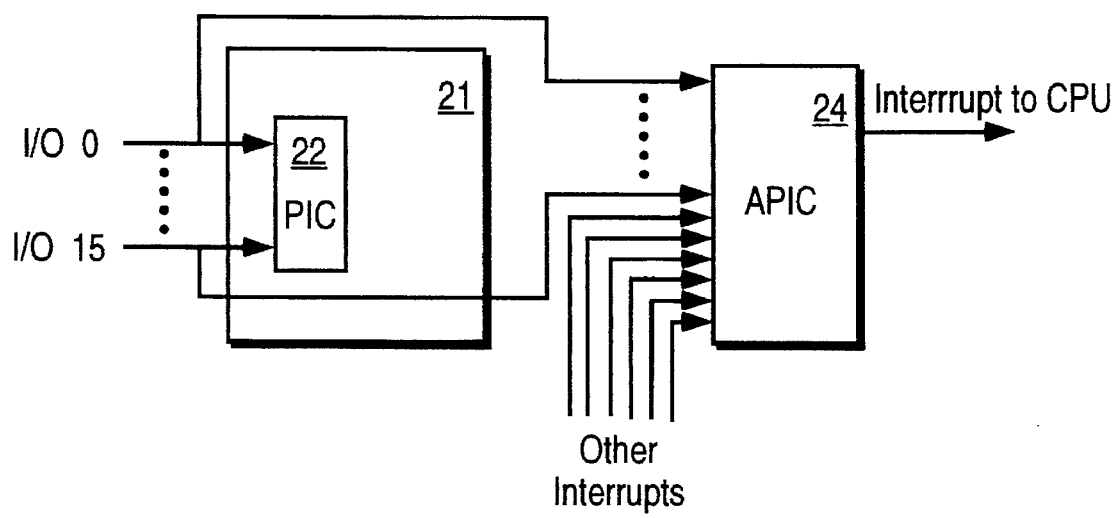
FIG. 2 is a block diagram of a hybrid interrupt controller arrangement in which the interrupts may be handled optimally.

FIG. 2 is a block diagram illustrating a hardware arrangement by which a pair of interrupt controllers may be integrated into a computer system. As may be seen in FIG. 2, the typical hardware interrupts utilized by prior art Intel processors are routed to the PIC interrupt controller 22 which is part of the circuitry on an integrated circuit 21. Each of these interrupts is also routed around the PIC controller 22 to one of the input terminals of a newer APIC controller 24. As will be illustrated later, each of the inputs to the APIC is associated with a register in which may be stored a vector which includes the priority assigned to the particular hardware device or the task associated with that input terminal as well as data defining how that interrupt is to be handled. In this way, any particular interrupt may be programmed to meet the particular circumstances under which the computer system is operating. By routing the various hardware interrupts around the controller 22, each of these interrupts may be assigned a programmable vector so that the negative aspects of that interrupt controller may be avoided. Thus, the fact that the controller 22 cannot coordinate the priority of both the hardware and software interrupts, cannot change the established priority of any hardware device, and cannot function with multiple processors is negated through the association with the APIC controller 24.

On the other hand, many processors of the Intel type have been manufactured in which some of the devices used with those processors have been integrated into the chip sets with the other devices. One of these devices is the PIC. In some cases where this has happened, various hardware devices also associated with the processor which provide interrupts to the interrupt controller have also been embedded in the same integrated circuit. In such a case, it often happens that no external terminal has been provided on the integrated circuit at which the interrupt signal may be accessed. Because of this, it is impossible to route the embedded hardware interrupt around the PIC controller. Consequently, the interrupt from the embedded hardware can only be provided from the output terminal of the PIC to one of the input terminals of the APIC. In such a case, the interrupt must be treated as non-programmable since the priority of the interrupt and the interrupting device are not known to the APIC. Moreover, such an interrupt may not be transferred to other processors as may normal interrupts furnished to the APIC controller.

For example, in a number of processors of the Intel type, the timing pulse generation circuitry and a PIC interrupt controller are embedded in the chip so that there is no external pin by which the timer interrupt may be transferred to the processor except through the PIC interrupt controller. As those skilled in the art will understand, the timing interrupt is often very important; and, consequently, when that interrupt is provided to the APIC through the PIC, the interrupt must be treated as having the highest priority available. Consequently, the timer interrupt can only occur with these processors at the speed of the PIC operations thereby slowing the entire interrupt operations to that speed.

Figure 3:
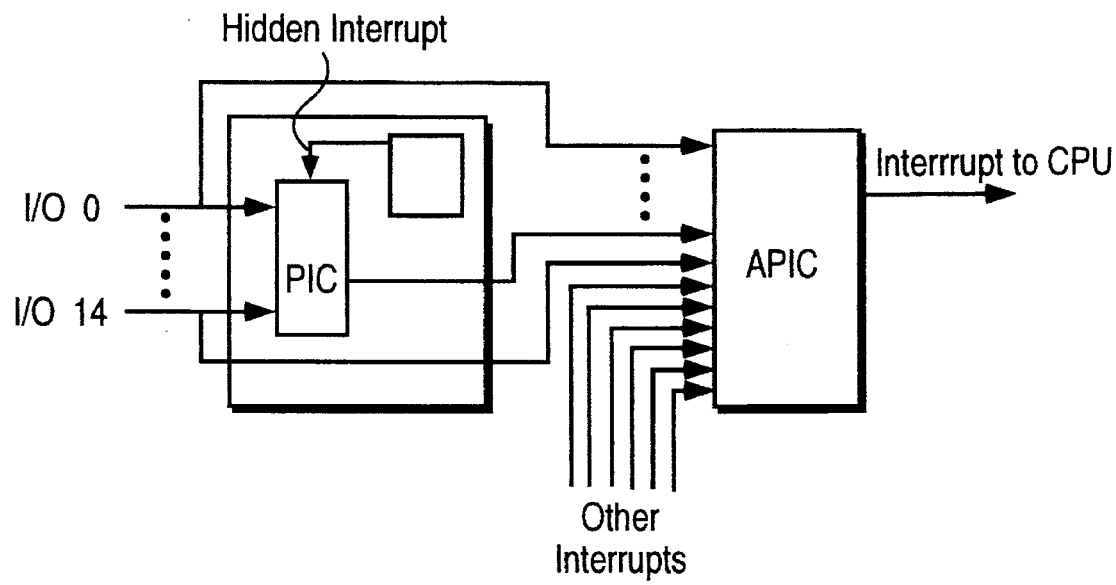
FIG. 3 is another block diagram of a hybrid interrupt controller arrangement in which the interrupts are not all available to both of the interrupt controllers.

It has been determined that software may be utilized to work around the sort of difficulty encountered in arrangements such as that illustrated in FIG. 3. However, the software process must handle the interfacing of both hardware and software priorities since the PIC controller has no ability to recognize software interrupts and because the APIC does not provide priorities for inputs from the PIC. Thus, the software must itself provide means of evaluating the level of the hardware interrupt and compare that level to levels presently running in order to determine whether the interrupt should be run or kept pending. The software must also provide a means for comparing that interrupt to other interrupts when it is running to see whether it should be interrupted. As will be recognized, the software necessary to provide such facilities has slowed the software operation of controlling interrupts to the speed at which the typical PIC controller operates, entirely negating the benefit of the APIC.

Figure 4:
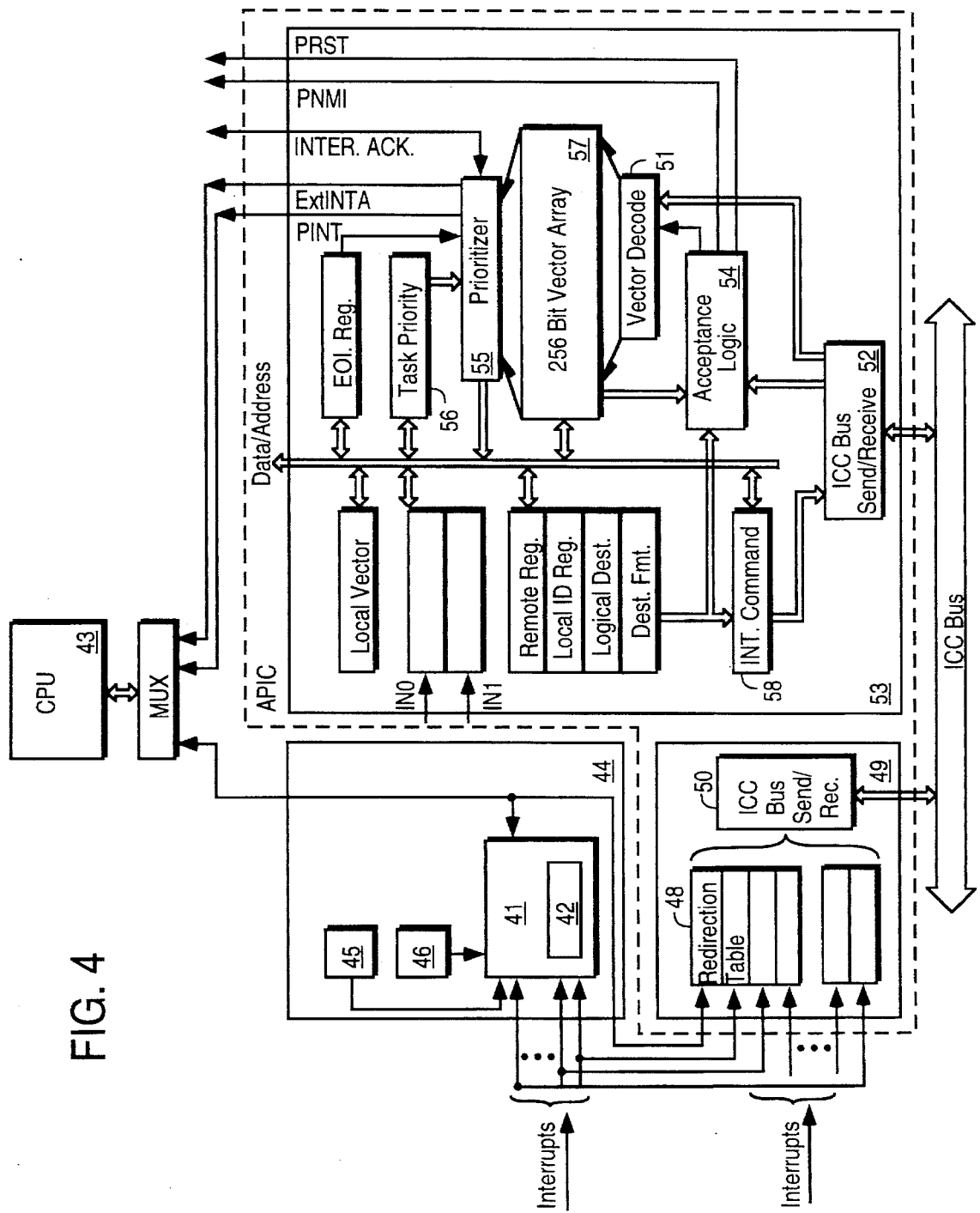
FIG. 4 is a more specific block diagram of a hybrid interrupt controller arrangement which may be utilized in accordance with the present invention.
Figure 5:
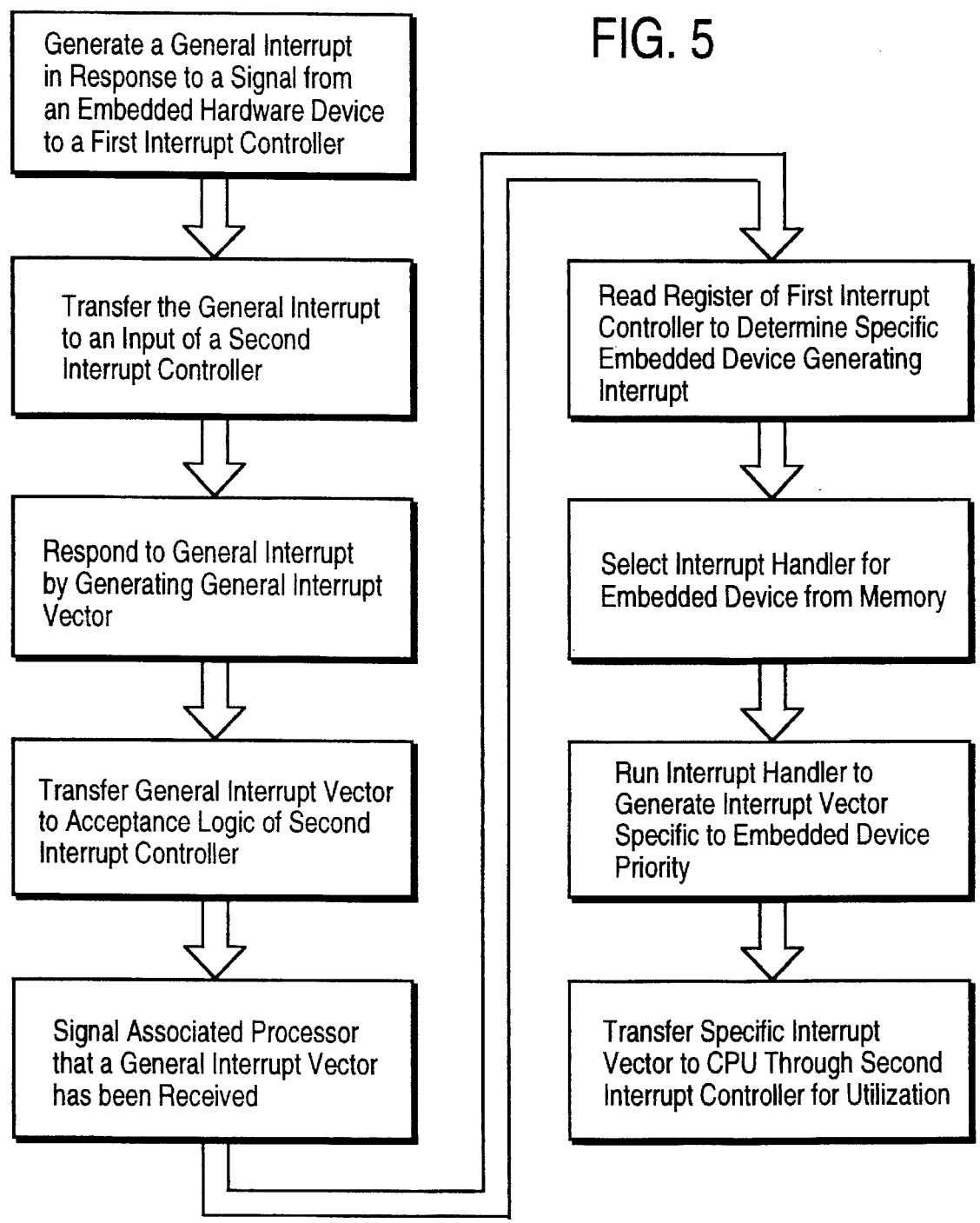
FIG. 5 is a flow chart illustrating a method of operating the hybrid interrupt controller arrangement illustrated in FIG. 4.

We have now devised a method for accelerating the operation of processors in which one or more devices providing hardware interrupts are embedded in the manner illustrated in FIG. 3. This arrangement utilizes software but exacts no software penalty by that use. FIG. 4 illustrates a hardware arrangement of the APIC and a single PIC in accordance with the present invention which may provide interrupts to the APIC from hardware devices which are buried without slowing the operation of the APIC. FIG. 5 describes a method in accordance with the invention which may be practiced using the hardware arrangement of FIG. 4. For the purpose of describing the present invention, the PIC controller 41 is illustrated in block form with only a single internal register, a status register 42, being illustrated. The PIG includes a plurality of input terminals to which are directed the various hardware interrupt input signals known to the prior art Intel lines of processors. The PIC 41 is illustrated as embedded in an integrated circuit 44 which also includes a direct memory access (DMA) device 45 and a timer generator circuit 46. Each of the DMA 45 and the timer circuit 46 are connected to provide interrupt input signals directly to the PIG 41 and, consequently, have no external pins on the integrated circuit 44 at which the interrupt input signals may be accessed. Other hardware device interrupts are provided to the PIG on a number of input conductors from circuitry not shown in FIG. 4.

The hardware interrupt signals provided to the PIC 41 from sources external to the integrated circuit chip on which the PIC resides appear on external pins and are routed directly to the input terminals of the APIC. The interrupts received by the APIC on these interrupt input terminal are assigned vectors by the system basic input/output startup (BIOS) routine at startup of the computer system of which the APIC is a part. These vectors designate the priority of each of the interrupts and thereby determine how they are to be treated by the APIC during operation of the computer system. Because they are routed directly to the APIC, these interrupts need not be handled by the PIC; and typically their appearance is masked to the PIC. These interrupt vectors are stored in a redirection table 48 which is a portion of an input/output unit 49 of the APIC.

The input/output unit 49 is where interrupts from input/output devices are received. An interrupt selects the interrupt vector stored in the redirection table 48 for that interrupt and formats an interrupt request message which is broadcast on the ICC bus by a send receive unit 50. The message broadcast on the ICC bus is received by an ICC bus send/receive unit 52 in a local unit 53 of each of the controllers. The controller may be associated with a processor to which the interrupt is addressed or it may be associated with a processor handling the operation having the lowest priority. The controller checks the address with an address held in its local ID register or an address held in a logical destination register to determine whether it is the interrupt controller for the processor which has been addressed.

In general, presuming that an interrupt is addressed to a processor associated with a particular APIC, then the interrupt is accepted by acceptance logic 54 and the vector is decoded by a vector decode table. The vector decoded is then transferred to a vector array 57 where it may be immediately handled by the processor or placed in an interrupt queue under control of a prioritizer logic circuit 55 depending on the priorities of other interrupts being handled by the APIC. The priority of a task being handled is placed in a task priority register 56 so that it may be compared to the priority of other interrupts sent to the controller in order to determine whether it should itself be interrupted by a higher priority signal.

When an interrupt is sent to the processor 43 by the APIC, the processor 43 reads the details of the vector decoded and obtains the entry point (address in memory) of the handler software for the interrupt. The interrupt is then processed. When the interrupt is complete, the interrupt handler process sends back an end of interrupt (EOI) signal to the APIC.

It should be noted that the local processor 43 may inject interrupts into the system by writing an interrupt vector to an interrupt command register 58. Such an interrupt vector is similar to the vectors placed in the redirection table on start-up by the system BIOS. This procedure allows any processor to generate an interrupt vector for transmission to other processors in the computer system. The vector written to the interrupt command register 58 includes the identity of the interrupt being sent and its destination address including whether it is to be sent to the processor handling the lowest priority. Writing the vector to the interrupt command register 58 causes an interrupt request message to be broadcast on the ICC bus.

The interrupt input signals provided to the PIC 41 by the DMA device 45 and the timer generator circuit 46 cause the PIC 41 to generate an output interrupt which would normally be transferred to the associated processor 43 to interrupt that processor 43. However, in accordance with the present innovation, these interrupts are transferred to the APIC. At the APIC, the interrupts from the PIC are received by the redirection table 48. As pointed out, the redirection table of the APIC includes interrupt vectors which are generated by the system BIOS at startup. For each specific identifiable input interrupt which may be sent to the redirection table of the APIC at a particular input terminal, a vector is provided which designates the priority of that vector, its address, and various details of how it is to be handled by the APIC. This allows the specific interrupts to be handled entirely by the APIC hardware. However, because the interrupts from the PIC output terminal are not specific to a particular hardware device but are simply labeled as from the PIC 41, they are not given an ordinary vector which designates priority but, instead, are transferred as interrupt request messages to the ICC bus with information that designates them as general PIC interrupts.

These interrupt request messages are received in an ICC bus send/receive unit 52 of the APIC on the ICC bus and are transferred to the acceptance logic 54. Because they are designated as general PIC interrupts and are addressed to the APIC, they are accepted by the acceptance logic circuit 54 of the APIC. However, this general vector cannot be decoded by the vector decode circuit 51. Instead, the acceptance circuit 54 causes the prioritizer logic 55 to generate an external interrupt signal ExtINTA and a signal PINT. The external interrupt signal ExtINTA and the signal PINT are transferred to the associated processor 43. The associated processor 43 responds to the signal ExtINTA and the signal PINT by reading the value held in the status register 42 of the PIC 41. This value designates the particular hardware device which has generated the output signal from the PIC 41. In fact, the value held in the status register 42 is the interrupt value which is used in older INTEL computer systems to set the particular hardware interrupt for the processor. The combination of the signal ExtINTA, the signal PINT, and the value in the status register 42 directs the processor to a software routine held in the system area of memory. This software routine is created to service this particular interrupt. In fact, this software routine generates an interrupt vector designating the priority of the particular interrupt, its address, and the manner in which that interrupt is to be implemented. The interrupt vector generated is essentially the same as the other interrupt vectors stored in the redirection table of the input/output unit of the APIC. Thus, by the use of this software routine, the non-programmable interrupt value used by the PIC 41 for the processor is translated into an interrupt vector adapted to be utilized by the APIC controller. This interrupt service routine causes the processor to load the interrupt vector into the interrupt command register 58 in the APIC.

As pointed out above, the interrupt command register 58 is a general register used by the APIC to service interrupts of all types which are generated locally by the processor 43. A vector placed in this register is automatically broadcast as an interrupt request message onto the ICC bus and directed to the processor to which the vector is addressed. This may be and, in fact, probably will be the same processor with which the vector was originally associated. In any case, the vector is transferred to a processor and handled by that processor in the same manner as are all interrupts generated by specified devices generating interrupts directly connected to the input terminals of the APIC and all software task interrupts. Thus, the interrupt is handled completely in hardware once the vector has been ascertained without the need to provide software processes for relating the priority of the particular device to the priority of other devices or to the priority of the various task interrupts. This greatly accelerates the process of controlling interrupts in systems utilizing hybrid controller arrangements of the type described. As pointed out, the interrupt is now programmable and may be distributed to any of the processors associated with the ICC bus.

As will be understood by those skilled in the art, the use of this method by which a software routine stored in memory is detected in response to the general interrupt vector and translates the non-programmable interrupt value used by the PIC for the processor into an interrupt vector adapted to be utilized by the APIC controller allows interrupts from embedded devices to be programmable and distributable to other processors. For example, the system BIOS may be utilized to program the priority value of the vector to be generated by the software routine stored in memory whenever the system is started along with the priority values of the other interrupts utilized with the system.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for generating an interrupt having a programmable priority value for an embedded hardware device from a first interrupt controller which provides non-programmable interrupts for a processor associated with a second interrupt controller providing programmable interrupts for the processor, the method including the steps of:

generating a general interrupt at the output of the first interrupt controller in response to a particular interrupt to the processor from the embedded hardware device, transferring the general interrupt to the second interrupt controller, responding to the general interrupt by accepting that interrupt and signaling the processor that a general interrupt has been received by the second interrupt controller, reading a register of the first interrupt controller to determine the particular interrupt causing the generation of the general interrupt, said processor writing an interrupt vector for the particular interrupt to a register of the second interrupt controller, and processing the particular interrupt based on the interrupt vector written to the register of the second interrupt controller.

2. A method for generating an interrupt as claimed in claim 1 in which the step of processing the interrupt based on the interrupt vector written to the register of the second interrupt controller includes the step of broadcasting the interrupt vector written to the register of the second interrupt controller to a bus to which said second interrupt controller is coupled.

3. A method for generating an interrupt as claimed in claim 2 in which the interrupt vector written to the register of the second interrupt controller includes an address of a processor.

4. A method for generating an interrupt as claimed in claim 2 which comprises the further steps of:

detecting the interrupt vector which has been broadcast on the bus, and processing the interrupt vector detected using the second interrupt controller.

5. A method for generating an interrupt as claimed in claim 1 in which the step of said processor writing an interrupt vector for the particular interrupt to a register of the second interrupt controller includes the steps of selecting from a memory an interrupt handler routine for the particular interrupt which caused the generation of the general interrupt, running the interrupt handler routine to write the interrupt vector for the particular interrupt to the register of the second interrupt controller.

6. In a computer system including at least one processor, a first interrupt controller providing interrupts for the processor having a priority which is not programmable, a second interrupt controller providing interrupts for the processor having a priority which is programmable, and an embedded hardware device furnishing a signal to indicate an interrupt to the first interrupt controller, a method for causing an interrupt furnished by the first controller in response to the signal to indicate an interrupt from the embedded hardware device to have programmable priority including the steps of:

generating a general interrupt at the output of the first interrupt controller in response to a signal to the processor from the embedded hardware device, transferring the general interrupt to the second interrupt controller, responding to the general interrupt by accepting the general interrupt and signaling the processor that the general interrupt has been received by the second interrupt controller, determining from the first interrupt controller the embedded hardware device causing the generation of the general interrupt, said processor transferring an interrupt vector for the embedded hardware device to a register of the second interrupt controller, and servicing the embedded hardware device based on the interrupt vector written to the register of the second interrupt controller.

7. A method for generating an interrupt as claimed in claim 6 in which the step of servicing the embedded hardware device based on the interrupt vector written to the register of the second interrupt controller includes the step of broadcasting the interrupt vector written to the second interrupt controller to a bus to which a third interrupt controller is coupled, the third interrupt controller providing interrupts for a second processor having a priority which is not programmable.

8. A method for generating an interrupt as claimed in claim 7 which comprises the further step of detecting the interrupt vector which has been broadcast on the bus, and processing the interrupt vector detected using the second interrupt controller.

9. A method for generating an interrupt as claimed in claim 6 in which the interrupt vector transferred to the second interrupt controller includes an address of a processor.

10. A method for generating an interrupt as claimed in claim 6 in which the step of said processor transferring an interrupt vector for the embedded hardware device to the second interrupt controllers includes the steps of selecting from a memory an interrupt handler routine for the embedded hardware device, running the interrupt handler routine to transfer the interrupt vector for the embedded hardware device to a register of the second interrupt controller.

11. A method for generating an interrupt having a programmable priority value for an embedded hardware device from a first interrupt controller which provides non-programmable interrupts for a processor associated with a second interrupt controller providing programmable interrupts for the processor, the method including the steps of:

storing a routine in memory for generating an interrupt vector having a specified priority and a specified address, generating a general interrupt using the first interrupt controller in response to a signal from the embedded hardware device, responding to the general interrupt by identifying the embedded hardware device from the first interrupt controller, selecting the routine in memory in response to the occurrence of the general interrupt vector and identification of the embedded hardware device, running on the processor the software routine stored in memory to generate the interrupt vector, and transferring the interrupt vector to the second interrupt controller.

12. A method for generating an interrupt having a programmable priority value as claimed in claim 11 further comprising the step of selecting a priority value for the interrupt vector during the step of storing a routine in memory for generating an interrupt vector having a specified priority and a specified address.

13. A method for generating an interrupt having a programmable priority value as claimed in claim 12 in which the step of storing a routine in memory for generating an interrupt vector having a specified priority and a specified address is accomplished by a basic input/output startup (BIOS) routine.

14. A method for generating an interrupt having a programmable priority value as claimed in claim 11 in which the step of transferring the interrupt vector to the second interrupt controller comprises placing the interrupt vector on an interrupt control communication bus.

15. A method for generating an interrupt having a programmable priority value as claimed in claim 11 in which the step of responding to the general interrupt by identifying the embedded hardware device from the first interrupt controller comprises a step of reading a value stored by the first interrupt controller which identifies the embedded hardware device.

16. A method for generating an interrupt having a programmable priority value as claimed in claim 11 in which the step of responding to the general interrupt by identifying the embedded hardware device from the first interrupt controller comprises the steps of:

responding to the general interrupt by generating an identifying interrupt in the second interrupt controller, and responding to the identifying interrupt by generating a signal to cause the processor to interrogate the first interrupt controller to identify the embedded hardware device.

17. A method for generating an interrupt having a programmable priority value as claimed in claim 16 in which the step of transferring the interrupt vector to the second interrupt controller comprises the steps of:

writing the interrupt vector to a register of the second interrupt controller, and broadcasting the vector on an interrupt control communication bus.

18. A method for generating an interrupt having a programmable priority value as claimed in claim 11 in which the steps of:

generating a general interrupt using the first interrupt controller in response to a signal from the embedded hardware device, and transferring the interrupt vector adapted to be utilized by the second interrupt controller to the second interrupt controller are accomplished by an interrupt controller.

19. A method for generating an interrupt having a programmable priority value for an embedded hardware device from a first interrupt controller which provides non-programmable interrupts for a processor associated with a second interrupt controller providing programmable interrupts for the processor, the method including the steps of:

generating a general interrupt at the output of the first interrupt controller in response to a signal from the embedded hardware device, transferring the general interrupt to the second interrupt controller, responding to the general interrupt by accepting the general interrupt and signaling the processor that the general interrupt has been received by the second interrupt controller, reading a register of the first interrupt controller to determine the embedded hardware device caused the generation of the general interrupt, said processor writing an interrupt vector for the embedded hardware device to a register of the second interrupt controller, determining the programmable priority value for servicing the embedded hardware device based on the interrupt vector, and servicing the embedded hardware device using the second interrupt controller based on the programmable priority value.

20. A computer system comprising:

a first interrupt controller coupled to a first embedded hardware device, said first embedded hardware device generating a first signal to request servicing, said first interrupt controller generating a non-programmable interrupt in response to receiving said first signal from said first embedded hardware device;

a second interrupt controller prioritizing servicing of programmable interrupts based on programmable interrupt vectors; and a processor coupled to said first interrupt controller and said second interrupt controller, in response to said first interrupt controller generating said non-programmable interrupt, said processor transmitting to said second interrupt controller a first interrupt vector if said first signal was generated, said first interrupt vector for prioritizing servicing of said first embedded hardware device.

21. The computer system of claim 20, said second interrupt controller coupled to said first interrupt controller for receiving said non-programmable interrupt and transmitting a second signal to said processor indicating said first interrupt controller has generated said non-programmable interrupt.

22. The computer system of claim 20, said processor coupled to a memory having stored therein a handler, said processor executing said handler in response to said first interrupt controller generating said non-programmable interrupt, said processor executing said handler generating said interrupt vector and transmitting said interrupt vector to said second interrupt controller.

23. The computer system of claim 20 further comprising a memory coupled to said processor having stored therein said first interrupt vector, in response to said first interrupt controller generating said non-programmable interrupt, said processor retrieving said first interrupt vector from said memory for transmission to said second interrupt controller if said first signal was generated.

24. The computer system of claim 20, said second interrupt controller comprising a first storage area, in response to said first interrupt controller generating said non-programmable interrupt, said processor storing said first interrupt vector in said first storage area in said second interrupt controller if said first signal was generated.

25. The computer system of claim 20, said first interrupt controller coupled to a second embedded hardware device in addition to said first embedded hardware device, said second embedded hardware device generating a second signal to request servicing, said first interrupt controller generating said non-programmable interrupt in response to receiving either of said first signal and said second signal; and in response to said first interrupt controller generating said non-programmable interrupt, said processor transmitting to said second interrupt controller a second interrupt vector if said second signal was generated, said second interrupt vector for prioritizing servicing of said second embedded hardware device.

* * * * *

UNITED STATES PATENT AND TRADEMARK OFFICE
CERTIFICATE OF CORRECTION

PATENT NO. : 5,481,725
DATED : January 2, 1996
INVENTOR(S) : Jayakumar et al.

It is certified that error appears in the above-identified patent and that said Letters Patent is hereby corrected as shown below:

In the Abstract at [57] in line 20 delete "handier" and insert --handler--

In column 2 at line 50 delete "touting" and insert --routing--

In column 6 at line 40 delete "PIG" and insert --PIC--

In column 6 at line 47 delete "PIG 41" and insert --PIC 41--

In column 6 at line 50 delete "PIG" and insert --PIC--

In column 7 at line 31 delete "handier" and insert --handler--

In column 7 at line 33 delete "handier" and insert --handler--

In column 12 at line 44 delete "handier," and insert --handler,--

Signed and Sealed this

Thirty-first Day of December, 1996

*Attest:*

BRUCE LEHMAN

*Attesting Officer*  *Commissioner of Patents and Trademarks*